(12) United States Patent
Elbanhawy

(10) Patent No.: US 7,142,046 B1
(45) Date of Patent: Nov. 28, 2006

(54) CURRENT SHARING USING GATE MODULATED DIODES

(75) Inventor: Alaa Elbanhawy, Hollister, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 95 days.

(21) Appl. No.: 10/846,205

(22) Filed: May 14, 2004

(51) Int. Cl.
  *H02J 1/10* (2006.01)
  *G05F 1/40* (2006.01)
(52) U.S. Cl. .................... 327/543; 327/541; 307/52
(58) Field of Classification Search ............... 327/540, 327/541, 543; 307/52, 53; 363/65
  See application file for complete search history.

(56) References Cited

U.S. PATENT DOCUMENTS

| 4,941,026 | A |   | 7/1990  | Temple ..................... 257/333 |
| 5,510,641 | A |   | 4/1996  | Yee et al. .................. 257/367 |
| 5,672,958 | A | * | 9/1997  | Brown et al. ............... 323/269 |
| 5,726,505 | A | * | 3/1998  | Yamada et al. ............. 307/127 |
| 5,744,994 | A |   | 4/1998  | Williams .................... 327/374 |
| 5,818,084 | A |   | 10/1998 | Williams et al. ............ 257/329 |
| 5,929,690 | A |   | 7/1999  | Williams .................... 327/374 |
| 6,608,402 | B1| * | 8/2003  | Soo et al. .................... 307/52 |
| 6,788,036 | B1| * | 9/2004  | Milavec et al. ............. 323/272 |
| 6,903,946 | B1| * | 6/2005  | Wu ............................. 363/65 |
| 6,956,429 | B1| * | 10/2005 | Elbanhawy ................. 327/541 |
| 2004/0095021 | A1| * | 5/2004 | Fogleman et al. ............ 307/52 |

* cited by examiner

*Primary Examiner*—Timothy P. Callahan
*Assistant Examiner*—Terry L. Englund
(74) *Attorney, Agent, or Firm*—Sidley Austin LLP

(57) ABSTRACT

A system includes an output terminal at which power is provided to a load, wherein the load defines a load current. A respective power supply can be coupled to each of a plurality of input terminals for providing current to the load. Each of a plurality of gate modulated diodes is connected between the output terminal and a respective input terminal. Each gate modulated diode has a forward voltage drop that is controllable by a voltage signal applied to a gate of the gate modulated diode. Control circuitry is operable to apply the voltage signal at the gate of each gate modulated diode to control the respective forward voltage drop so that each power supply provides a substantially equal amount of current to the load.

16 Claims, 4 Drawing Sheets

CURRENT SHARING USING GATE MODULATED DIODES

TECHNICAL FIELD OF THE INVENTION

This invention relates to power management, and more particularly, to current sharing using gate modulated diodes.

BACKGROUND

Electronic devices, such as integrated circuits and microprocessors, require a power supply to operate. In some situations, it may be desirable to have more than one power supply available. Multiple power supplies are routinely connected in parallel for redundancy and in situations where more than one supply are needed to deliver the load current. With parallel supplies, it is desirable to equally distribute load current among the supplies. Otherwise, one or more power supplies may handle more than their respective share of current, thus leaving some power supplies essentially idle. This creates greater thermal stress on some units and reduces the reliability of the system.

Previously developed techniques for using parallel power supplies suffer from various problems and disadvantages. According to some previously developed techniques, current sharing among a parallel power supplies could only be achieved using elaborate feedback techniques that require access to the internal feedback loop of each power supply. This requires that the power supplies be designed for parallel operation. Also, some previously developed techniques require the use of one or more power diodes, such as Schottky diodes, for reliability. These power diodes collectively implement an "OR" function. Each power diode isolates a respective power supply in case a short circuit develops on the output terminal. In this case, the power diode may reverse bias and disconnects the associated circuit.

SUMMARY

According to an embodiment of the present invention, a system includes an output terminal at which power is provided to a load, wherein the load defines a load current. A respective power supply can be coupled to each of a plurality of input terminals for providing current to the load. Each of a plurality of gate modulated diodes is connected between the output terminal and a respective input terminal. Each gate modulated diode has a forward voltage drop that is controllable by a voltage signal applied to a gate of the gate modulated diode. Control circuitry is operable to apply the voltage signal at the gate of each gate modulated diode to control the respective forward voltage drop so that each power supply provides a substantially equal amount of current to the load.

According to another embodiment of the present invention, a system includes an output terminal at which power is provided to a load, wherein the load defines a load current. A respective power supply can be coupled to each of a plurality of input terminals for providing current to the load. Each of a plurality of gate modulated diodes is connected between the output terminal and a respective input terminal. Each gate modulated diode has a forward voltage drop that is controllable. Means are provided for controlling the respective forward voltage drop of each gate modulated diode so that each power supply provides a substantially equal amount of current to the load.

Important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION

The embodiments of the present invention and their advantages are best understood by referring to FIGS. 1 through 5 of the drawings. Like numerals are used for like and corresponding parts of the various drawings.

Figure 1:
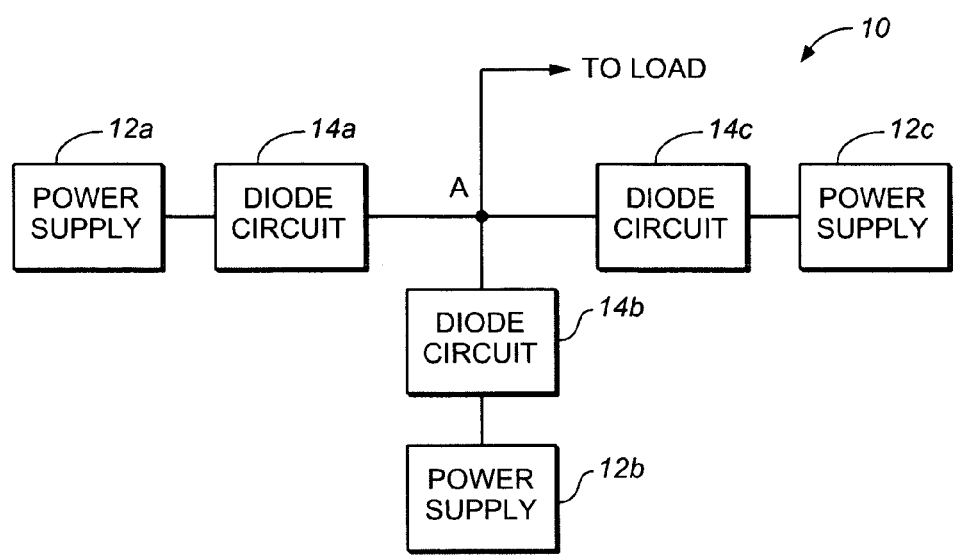
FIG. 1 is a high-level diagram of a system with multiple power supplies connected in parallel, according to an embodiment of the present invention.

FIG. 1 is a high-level diagram of a system 10 with multiple power supplies 12a, 12b, 12c connected in parallel, according to an embodiment of the present invention. System 10 may provide power for one or more electronic devices (e.g., high power base stations), which constitute the "load" for the system 10. The load may be connected to an output terminal (node A) for system 10.

Each of power supplies 12a, 12b, and 12c can be a voltage supply (as shown), or any other suitable supply for power. The embodiment shown in FIG. 1 includes three power supplies 12, but it is understood that other embodiments may have a greater or a fewer number of supplies. Power supplies 12a, 12b, and 12c are connected in parallel at node A (output terminal) to the load of system 10. Each power supply 12 provides some amount of current that may be supplied to the load. The various currents provided by the power supplies 12a, 12b, and 12c are added together or summed at the output terminal of system 10 for delivery to the load. Thus, the total current delivered to the load is "shared" by the parallel power supplies 12a, 12b, and 12c. In many applications, it is desirable that each power supply 12 in a parallel arrangement share or provide an equal amount of the total current supplied to the load. This increases the reliability of the system and reduces the thermal stress on specific power supplies.

A respective diode circuit 14 is provided for each power supply 12. As shown, diode circuits 14a, 14b, and 14c are connected between power supplies 12a, 12b, and 12c, respectively, and node A. Collectively, diode circuits 14 implement an "OR" function. That is, if any of power supplies 12 are operating, diode circuits will allow power to be supplied to node A. Furthermore, each diode circuit 14a, 14b, 14c isolates its respective power supply 12a, 12b, 12c from node A, thus providing protection for the power supply in case there is a short circuit at the output terminal of system 10. More specifically, if one of the power supplies 12 develops a short circuit at the output, its associated diode circuit 14 will be reverse biased, and no current will flow back into the power supply 12. In various embodiments of the invention, each diode circuit 14 can be implemented with a gate modulated diode (GMD) and simple control circuitry, as further described herein.

The GMD and simple control circuitry may replace the ORing diodes and the elaborate feedback schemes of previously developed techniques. The GMD and simple circuit achieve both isolation and current sharing and may be integrated in one package on a single or multiple integrated circuits (ICs) and/or discrete components.

This approach has numerous advantages, examples of which follow. There is no need to access the feedback loop of the individual power supplies, thus reducing complexity and the possibility of noise coupling to the feedback loop. Furthermore, the approach allows the use of power supplies that are not designed specifically for current sharing. The voltage drop a GMD can be equal to or better than that of a Schottky diode used in previously developed techniques, thus maintaining reliability.

Figure 2:
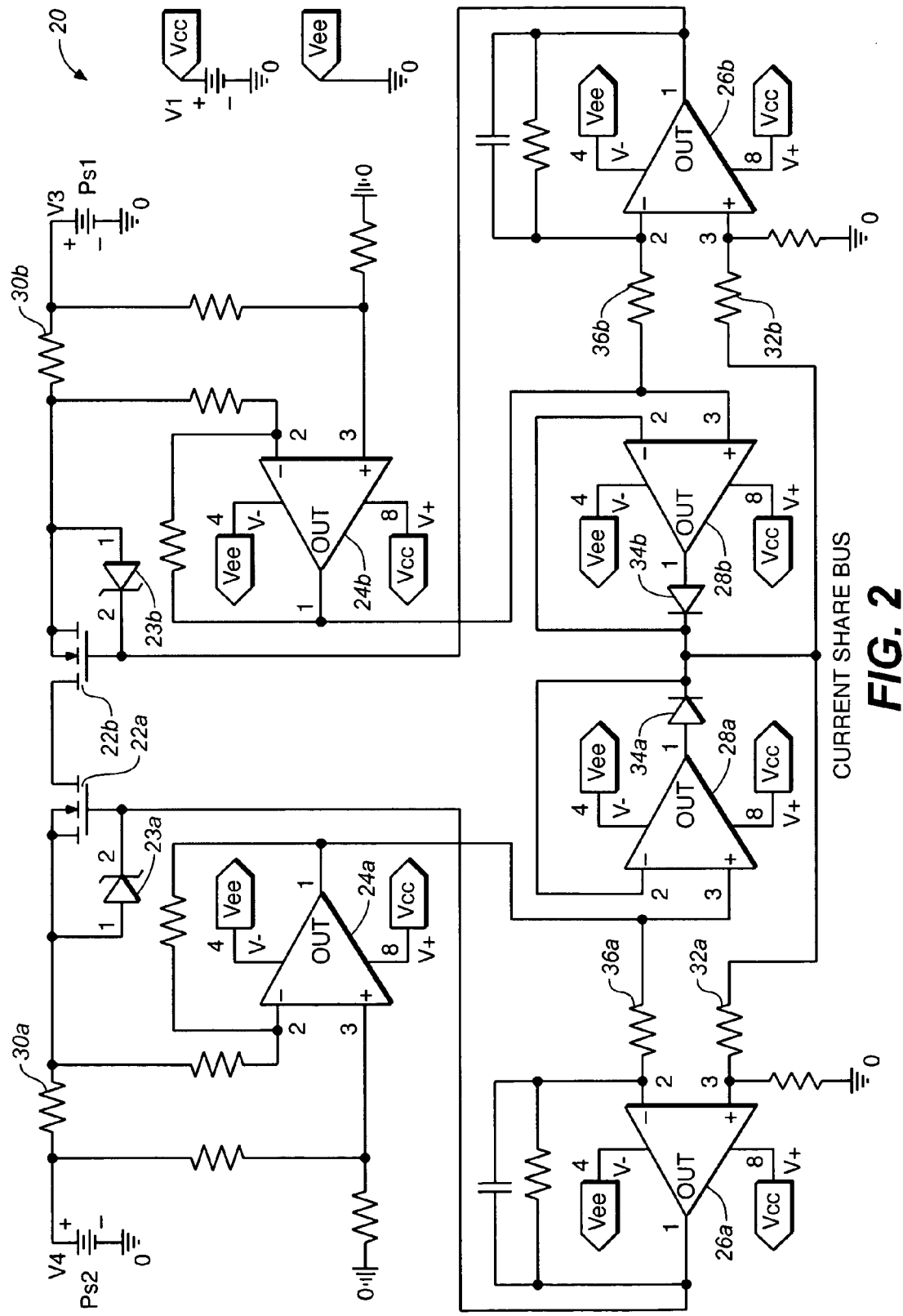
FIG. 2 is a schematic diagram of circuitry for current sharing in parallel power supplies using gate modulated diodes (GMDs), according to an embodiment of the present invention.

FIG. 2 is a schematic diagram of circuitry 20 for current sharing in parallel power supplies using gate modulated diodes (GMDs), according to an embodiment of the present invention. In the implementation shown in FIG. 2, circuitry 20 supports two power supplies, PS1 and PS2, which provide power to a load at the output terminal.

Circuitry 20 includes a respective diode circuit 14 for each power supply PS1 and PS2. As shown, each diode circuit 14 comprises a transistor 22 (separately labeled 22a and 22b) and a Zener diode (separately labeled as 23a and 23b). Each transistor 22 may function as a series pass transistor through which current flows from the input terminal to the output terminal of the system 10. Transistors 22 can each be implemented using any suitable transistor, such as, for example, a P-channel metal-oxide-semiconductor field effect transistor (MOSFET) in one embodiment. Transistors 22 can be implemented with any suitable device, such as, for example, a P-channel transistor.

The body of transistor 22 can function as a diode which allows current to flow in one direction but not the other. In other words, MOSFETs have a built-in body diode capable of conducting full MOSFET drain current. The transistor may have a voltage drop (e.g., greater than 0.6 V) in the direction of current flow. The voltage drop across the diode body is controlled by the gate-source voltage of transistor 22 when the voltage applied to the gate is less than the threshold voltage Vth of the transistor 22. That is, with respect to the region under the gate threshold voltage Vth, changing the voltage applied to the gate of the transistor 22 results in a change of the forward voltage drop. Experiments have shown that the voltage drop across the body diode while it is conducting current may be considerably reduced by applying an appropriate voltage to the gate at a voltage level below that of the gate threshold voltage Vth. As such, the diode implemented by transistor 22 may be considered a gate modulated diode (GMD)—the voltage drop may be modulated by the gate voltage to achieve a desirable voltage drop performance. The voltage across this GMD can be controlled to have very low dropout (LDO) voltage—e.g., less than 1 volt. In some embodiments, the voltage drop across the body diode of transistor 22 can be reduced to values better than Schottky rectifiers. For example, in some applications, the forward voltage drop across the GMD can be a relatively low value of 0.4V. An exemplary structure and more detailed discussion of the operation and application of a transistor as a GMD is provided below with reference to FIGS. 3 through 5. Another application for a GMD is described in U.S. patent application Ser. No. 10/774,581, filed on Feb. 9, 2004, entitled "LOW DROPOUT REGULATOR USING GATE MODULATED DIODE," now U.S. Pat. No. 6,956,429, the entirety of which is incorporated by reference herein.

Each GMD is controlled by respective circuitry connected to the gate of the respective transistor 22. The control circuitry functions to control the output current of each power supply so that the power supplies share the total current load equally. In some embodiments, the voltage at the gate of each transistor 22 is dependent on or controlled in response to the current output from the respective power supply PS1 or PS2, thus providing optimum current sharing between power supplies at the output node from relatively light to relatively full amounts (e.g., up to 40 or 50 amps per power supply).

As depicted, the gate of transistor 22a is controlled at least in part by operational amplifiers 24a, 26a, and 28a, and current sensing device 30a. Similarly, the gate of transistor 22b is controlled at least in part by operational amplifiers 24b, 26b, and 28b, and current sensing device 30b.

For each GMD, a current sensing device 30a (30b) is used for measuring or sensing the current being output by the power supply PS2 (PS1). Each current sensing device 30a (30b) can be implemented as a Hall-effect sensor, a magneto-resistive sensors, resistor, or any other suitable device. As depicted, current sensing devices 30a and 30b are implemented as resistors, each having a value of 0.1 Ohm.

A first operational amplifier 24a (24b) is connected at its + and − input terminals to either side of a respective current sensing device 30a (30b). The first operational amplifier 24a (24b) outputs a signal indicative of the current supplied by the respective power source PS1 (PS2). This signal is received at the + input terminal of a second operational amplifier 28a (28b). A diode 34a (34b) may be connected to the output terminal of the second operational amplifier 28a (28b). Taken together, the second operational amplifier 28a (28b) and respective diode 34a (34b) can implement an "ideal diode." The output of each diode 34a (34b) is connected to a current share bus. The current share bus has a voltage value or signal which is indicative of the highest current output by any power supply PS1 or PS2 in the system. This signal can be used as a reference for adjusting the gate of each transistor 22 or GMD.

The signal of the current share bus is received at the + input terminal of a third operational amplifier 26a (26b) through resistor 32a (32b). The − input terminal of the third operational amplifier 26a (26b) receives the output signal of the first operational amplifier 24a (24b) through a resistor 36a (36b). Resistors 32a (32b) and 36a (36b) may each have a value of 1 Kohms. The third operational amplifier 26a (26b) functions essentially to compare the current output by the respective power supply PS2 (PS1) against the highest current output by any power supply in the system. The third operational amplifier 26a (26b) outputs a signal which controls the gate of the respective transistor 22a (22b) or GMD in order to cause either more or less current to be supplied from the respective power supply PS1 or PS2.

In use, transistors 22a and 22b are controlled in circuitry 20 so that the amount of current supplied by each of power supplies PS1 and PS2 to output terminal (where the load appears) is substantially the same. More specifically, transistors 22a and 22b each operate as a gate modulated diode (GMD) having a relatively low forward voltage drop which varies depending on the voltage applied to its gate. As the load current or other conditions change, the voltage applied to the gate of each GMD may be changed so that the forward voltage drop across the diode is adjusted to allow substantially the same amount of current to be provided from each power supply PS1 and PS2.

For example, assuming that there are only two power supplies PS1 and PS2 in the system, if the output voltage of power supply PS1 is higher (e.g., by 50 mV) than power supply PS2, then the signal at the current share bus is determined by the output of power supply PS1. The second operational amplifier 26b for power supply PS1 compares the signal of the current share bus against the current sense signal from the respective first operational amplifier 24b and outputs a control signal which adjusts the voltage drop across the respective transistor 22b or GMD so that it is higher. Likewise, the second operational amplifier 26a for power supply PS2 compares the signal of the current share bus against the current sense signal from the respective first operational amplifier 24a and outputs a control signal which adjusts the voltage drop across the respective transistor 22a or GMD so that it is lower. The two voltage drops are adjusted so that substantially the same amount of current is provided by each power supply PS1 and PS2.

Similarly, for example, if the output voltage of power supply PS1 is lower (e.g., by 50 mV) than power supply PS2, then the signal at the current share bus is determined by the output of power supply PS2. The second operational amplifier 26b for power supply PS1 compares the signal of the current share bus against the current sense signal from the respective first operational amplifier 24b and outputs a control signal which adjusts the voltage drop across the respective transistor 22b or GMD so that it is lower. Likewise, the second operational amplifier 26a for power supply PS2 compares the signal of the current share bus against the current sense signal from the respective first operational amplifier 24a and outputs a control signal which adjusts the voltage drop across the respective transistor 22a or GMD so that it is higher. Again, the two voltage drops are adjusted so that substantially the same amount of current is provided by each power supply PS1 and PS2.

As such, transistors 22 may function as high-frequency, low-drop diodes where the voltage drop may be modulated by the gate voltage to achieve the desirable voltage drop performance. With proportionate drive where the gate voltage of each diode 22a (22b) is dependant on the current being provided by each power supply PS1 and PS2, embodiments of the present invention can achieve better efficiency and performance for the system.

In some embodiments, efficiency of the system can be further increased by minimizing the voltage drop across each GMD, thus reducing the power loss. This can be accomplished by providing an error control circuitry (not shown) which may be implemented with a feedback from the output node of the system and the output terminal of each second operational amplifier 26a or 26b. This allows, for example, the forward voltage drops of all of the GMDs to be reduced.

System 10 or circuitry 20 can be implemented on a single integrated circuit (IC) chip, multiple IC chips, and/or in discrete components. For example, in one embodiment, each transistor 22 can be implemented with any suitable device, such as, for example, a P-channel transistor (e.g., product no. FDS4465 available from Fairchild Semiconductor Corp.). Likewise, operational amplifiers 24, 26, and 28 can be implemented with one or more suitable components, such as, for example, product no. LM358 available from Fairchild Semiconductor Corporation.

Circuitry 20 provides numerous advantages over previous developed systems. For example, some previously developed systems with parallel power supplies and current sharing required specially designed power supplies which have access to a control loop. Such is not the case with circuitry 20. The power supplies PS1 and PS2 can be implemented with any suitable commercially-available power supplies, such as, for example, 5V or 12V power supplies. Furthermore, diode-blocking protection for the power supplies can provided in the system of circuitry 20 with minimal loss in efficiency.

Figure 3:
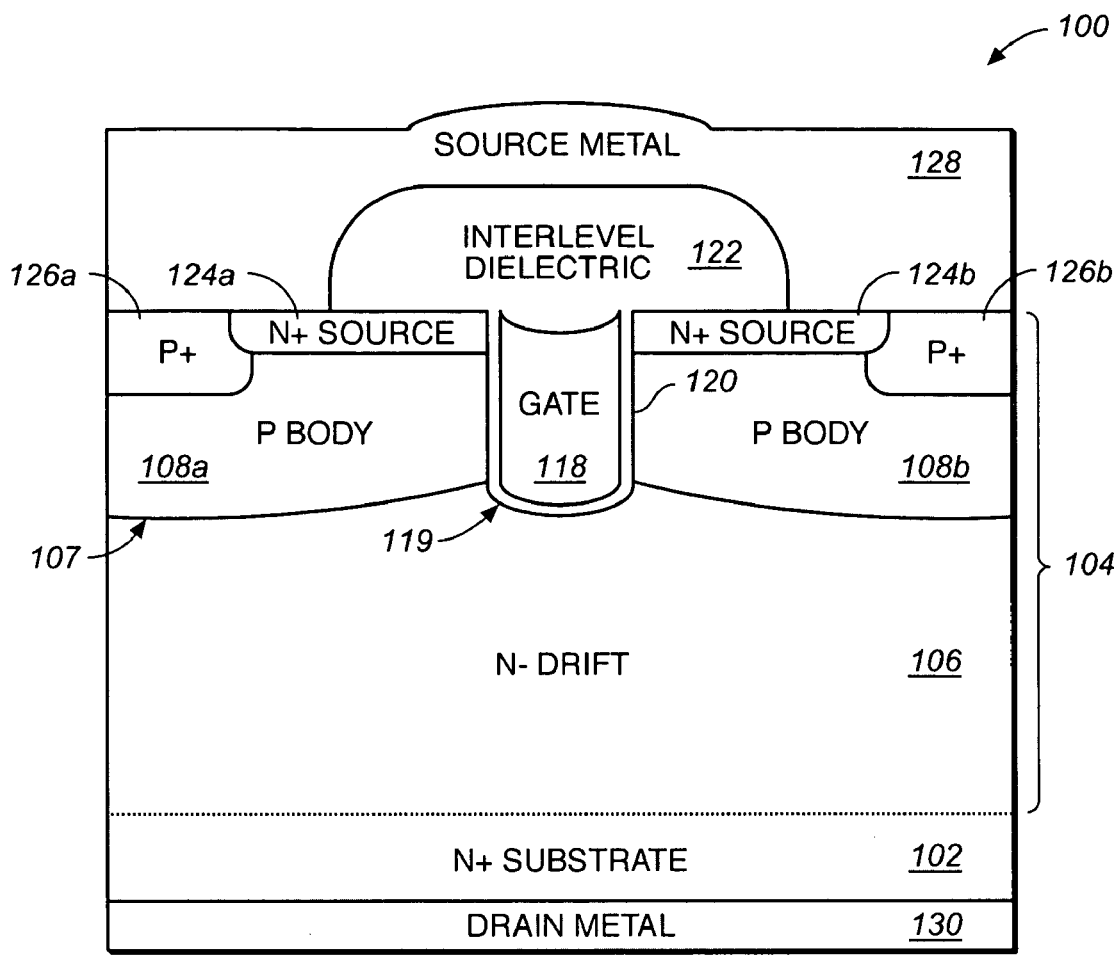
FIG. 3 illustrates a structure for a gate modulated diode.

FIG. 3 illustrates a structure for a gate modulated diode (GMD) 100. GMD 100 can be a p-channel, trench gate MOSFET. Such GMD 100 can be used as a rectifier and has a built-in body diode. In such MOSFET rectifiers, the built-in body diode conducts the full MOSFET drain current, and the voltage drop across the body diode is similar to that of a PN diode. The voltage drop across the body diode can be advantageously reduced from that of a PN diode by applying suitable voltages—e.g., positive voltages in the range of between 0V and the gate threshold voltage Vth in an N-channel MOSFET.

Referring to FIG. 3, the body diode of GMD 100 is made up of p-type body region 108 and n-type drift region 106. Further, as shown, GMD 100 also includes substrate 102, drain metal 130, gate 118, body regions 108a, 108b, source regions 124a, 124b, interlevel dielectric 122, source metal 128, and regions 126a, 126b. To cause the body diode to conduct, a higher potential is applied to the source (at source metal 128) than that applied to the drain (at drain metal 130). With source regions 124a and 124b and body regions 108a and 108b electrically shorted together, the higher body potential forward biases the body diode. To achieve rectification, the gate voltage is maintained below the gate threshold voltage Vth to prevent the MOSFET from conducting for positive drain-source voltages Vds. With the gate-source voltage Vgs =0V, the forward drop across the diode-operated MOSFET is the same as a PN diode. The forward voltage drop is significantly reduced by applying to the gate a positive voltage in the range of between 0V and gate threshold voltage Vth.

Figure 4:
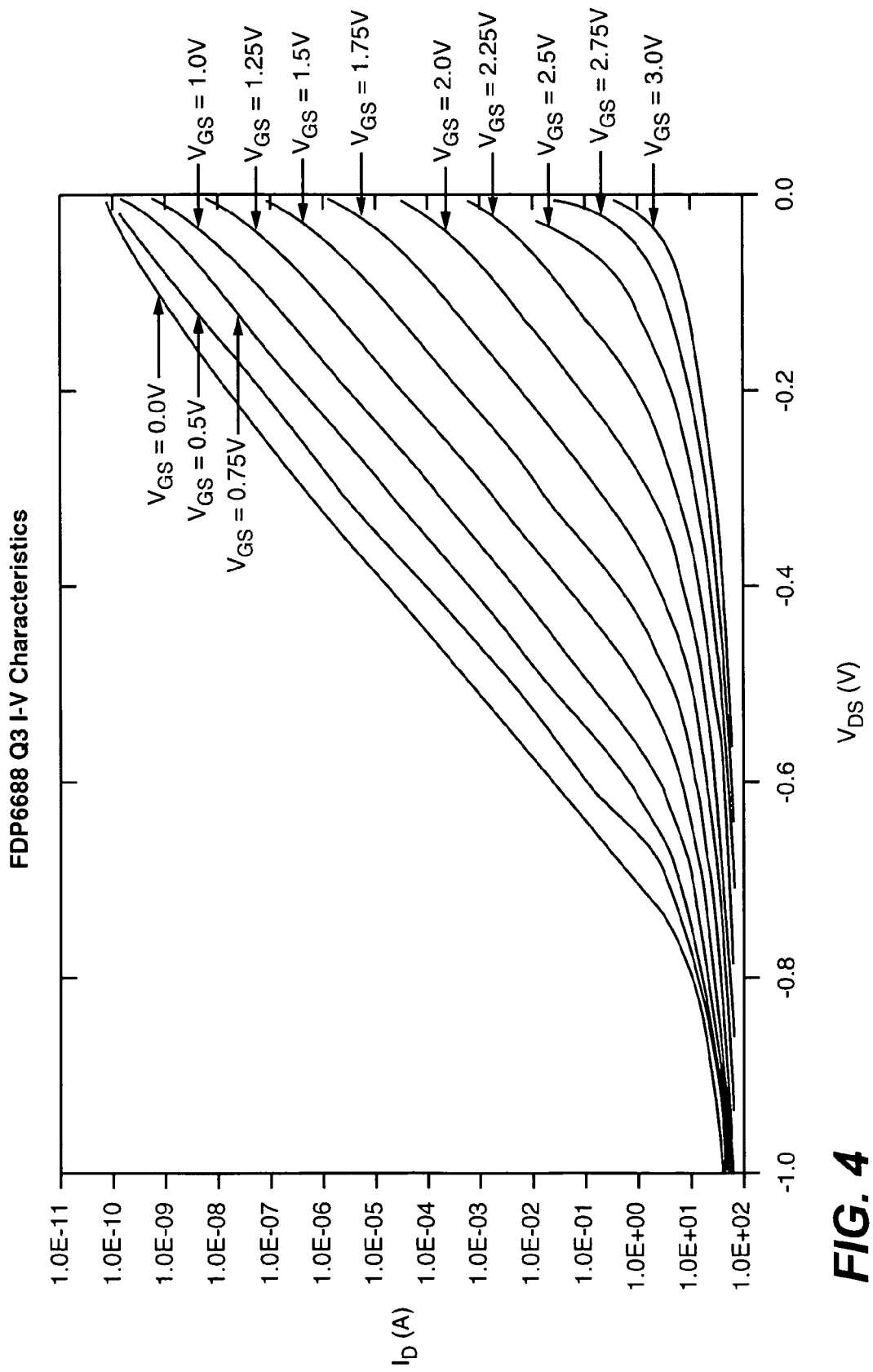
FIG. 4 is a chart illustrating the current-voltage characteristics of a MOSFET when operated as a gate modulate diode.

FIG. 4 is a chart illustrating the current-voltage (I-V) characteristics of a MOSFET when operated as a GMD. The vertical axis represents the drain current Id and the horizontal axis represents the drain-source voltage Vds of the transistor. The curves show the I-V characteristics for gate voltages ranging from 0V to 3V. As shown by these curves, the voltage drop across the transistor reduces as the gate voltage is increased from 0V. The same I-V characteristics have been observed in p-channel MOSFETs.

Figure 5:
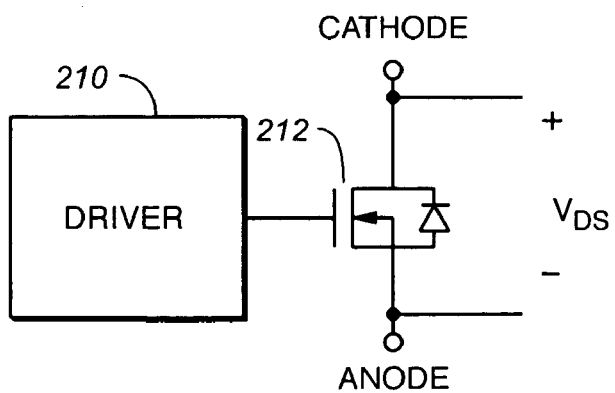
FIG. 5 is a schematic diagram in partial block form of an application for a gate modulated diode.

A number of low power, high frequency applications are possible in view of the particular characteristics of the GMD or diode-operated MOSFET shown in FIG. 4. FIG. 5 is a schematic diagram in partial block form of a general application in which the GMD is used to take advantage of the particular characteristics. In FIG. 5, a GMD or diode-operated MOSFET 212 is shown with the drain serving as the cathode terminal and the source serving as the anode terminal. The gate is biased by a driver block 210. Driver block 210 operates to modulate the gate voltage to obtain a precisely controlled forward voltage drop across MOSFET 212. That is, during operation, the gate biasing is modulated to increase or decrease the voltage drop as needed. This may be achieved by detecting the voltage across or the current through the MOSFET and in response adjusting the gate voltage to increase or decrease the forward voltage drop.

As described herein, system 10 is a elegant solution for parallel power supplies which does not require elaborate feedback techniques to implement or the use of power supplies specially designed for parallel operation. Compared to previously developed designs, system 10 is simple, efficient, and easily implemented.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A system comprising:
   an output terminal at which power is provided to a load, wherein the load defines a load current;
   a plurality of input terminals, wherein a respective power supply is coupled to each input terminal for providing current to the load;
   a plurality of gate modulated diodes, each gate modulated diode connected between the output terminal and a respective input terminal, wherein each gate modulated diode has a forward voltage drop that is controllable by a respective voltage signal applied to a gate of the gate modulated diode, wherein each gate modulated diode comprises a transistor operating at below gate threshold voltage; and
   control circuitry operable to apply the respective voltage signal at the gate of each gate modulated diode to control the respective forward voltage drop so that each power supply provides a substantially equal amount of current to the load.

2. The system of claim 1 wherein the control circuitry comprises a separate current sensing device for each power supply, each current sensing device for sensing the current output by the respective power supply.

3. The system of claim 2 wherein each current sensing device comprises a resistor.

4. The system of claim 2 wherein each current sensing device comprises a Hall-effect sensor.

5. The system of claim 2 wherein each current sensing device comprises a magneto-resistive sensor.

6. The system of claim 1 wherein the transistor of each gate modulated diode comprises a MOSFET.

7. The system of claim 1 wherein the control circuitry comprises a separate operational amplifier for each power supply, each operational amplifier operable to compare a signal indicative of the current output by the respective power supply against a reference signal.

8. The system of claim 7 wherein the reference signal is indicative of the highest current output by any power supply in the system at a given moment.

9. A system comprising:
   an output terminal at which power is provided to a load, wherein the load defines a load current;
   a plurality of input terminals, wherein a respective power supply is coupled to each input terminal for providing current to the load;
   a plurality of gate modulated diodes, each gate modulated diode connected between the output terminal and a respective input terminal, wherein each gate modulated diode has a forward voltage drop that is controllable, wherein each gate modulated diode comprises a transistor operating at below gate threshold voltage; and
   means for controlling the respective forward voltage drop of each gate modulated diode so that each power supply provides a substantially equal amount of current to the load.

10. The system of claim 9 wherein the means for controlling comprises a separate current sensing device for each power supply, each current sensing device for sensing the current output by the respective power supply.

11. The system of claim 10 wherein each current sensing device comprises a resistor.

12. The system of claim 10 wherein each current sensing device comprises a Hall-effect sensor.

13. The system of claim 10 wherein each current sensing device comprises a magneto-resistive sensor.

14. The system of claim 9 wherein the transistor of each gate modulated diode comprises a MOSFET.

15. The system of claim 9 wherein the means for controlling comprises a separate operational amplifier for each power supply, each operational amplifier operable to compare a signal indicative of the current output by the respective power supply against a reference signal.

16. The system of claim 15 wherein the reference signal is indicative of the highest current output by any power supply in the system at a given moment.

* * * * *